(12) United States Patent
Chiang et al.

(10) Patent No.: US 8,126,263 B2
(45) Date of Patent: Feb. 28, 2012

(54) CLASSIFYING METHOD AND CLASSIFYING APPARATUS FOR DIGITAL IMAGE

(75) Inventors: Jia-Jie Chiang, Pingihen (TW);
Po-Hsuan Liao, Taoyuan County (TW);
Cheng-Wei Lin, Taoyuan County (TW)

(73) Assignee: Quanta Computer Inc. (TW)

( * ) Notice: Subject to any disclaimer, the term of this patent is extended or adjusted under 35 U.S.C. 154(b) by 1025 days.

(21) Appl. No.: 12/000,140

(22) Filed: Dec. 10, 2007

(65) Prior Publication Data
US 2009/0010497 A1    Jan. 8, 2009

(30) Foreign Application Priority Data

Jul. 6, 2007   (TW) .............................. 96124691 A

(51) Int. Cl.
*G06K 9/00*  (2006.01)
(52) U.S. Cl. ........ 382/165; 382/224; 382/232; 382/162; 382/173; 382/250
(58) Field of Classification Search .................. 382/162, 382/164, 165, 308, 173, 190, 232, 233, 250, 382/251; 358/426.01, 426.16; 348/395, 348/403, 408
See application file for complete search history.

(56) References Cited

U.S. PATENT DOCUMENTS 5,867,593 A * 2/1999 Fukuda et al. ................ 382/176
(Continued)

FOREIGN PATENT DOCUMENTS

| CN | 1797471 A | 12/2004 |
|----|-----------|---------|
| TW | I258055 | 7/2006 |
| TW | I281126 | 5/2007 |

OTHER PUBLICATIONS

Image Segmentation Using a Combined DCT and Neural Networks Technique, Hsuan-Ming Hsu, Jul. 2005, Tainan, Taiwan, Republic of China.

(Continued)

*Primary Examiner* — Samir Ahmed
*Assistant Examiner* — Ali Bayat
(74) *Attorney, Agent, or Firm* — Thomas, Kayden, Horstemeyer & Risley, LLP.

(57) ABSTRACT

The invention provides a classifying method for digital images. First, a discrete cosine transform is performed on a candidate area of a digital image to generate a set of discrete cosine transform coefficients. Then, a set of texture parameters is generated based on the set of discrete cosine transform coefficients. At last, a classified result of the digital image is generated based on the set of texture parameters.

13 Claims, 4 Drawing Sheets

U.S. PATENT DOCUMENTS

| | | | |
|---|---|---|---|
| 6,115,717 A * | 9/2000 | Mehrotra et al. | 1/1 |
| 6,456,328 B1 * | 9/2002 | Okada | 348/699 |
| 6,493,023 B1 * | 12/2002 | Watson | 348/180 |
| 6,741,655 B1 * | 5/2004 | Chang et al. | 375/240.26 |
| 7,609,888 B2 * | 10/2009 | Sun et al. | 382/173 |
| 2003/0194131 A1 * | 10/2003 | Zhao et al. | 382/190 |
| 2005/0163378 A1 * | 7/2005 | Chen | 382/190 |

OTHER PUBLICATIONS

Office Action in Related Taiwan Application dated Jan. 1, 2011.

English Translation of Taiwan Office Action dated Jan. 1, 2011.

A Face Detection System Using Adaptive Face Features Extraction, Mark Lee Jason, Zong Mu, CM Tsai, 2006.

* cited by examiner

CLASSIFYING METHOD AND CLASSIFYING APPARATUS FOR DIGITAL IMAGE

BACKGROUND OF THE INVENTION

1. Field of the Invention

The invention relates to image classification, and particularly, to a digital image classifying method and apparatus.

2. Description of the Prior Art

In recent years, the innovative and progressive image technology makes the market of digital image vigorously developed as well. At present, most of the pictures are taken in a digitized way (e.g., taken by a digital camera) and stored in a digitized format (e.g., stored in a memory card, compact disk, or a hard disk).

In general, after a large number of digital images are taken by a user, these images will be stored in a memory card, transmitted to a hard disk of a personal computer, or duplicated as a photo compact disk. After accumulating the digital images over a long period of time, the number and types of the digital images stored in all formats of storing apparatus will be constantly increasing. If appropriate management and classification are not performed at this moment, these digital images will be stored in a state of chaos and disorder. Especially when a user wants to find a picture taken many years ago, it will be virtually a mission impossible if there is not a good image classification. Therefore, it is more than important to perform image classification.

Among the image classifying technologies, the conventional way is for the user to judge the image according to the content of the picture. However, the digital image classifying method, which requires human labor to distinguish all pictures is not just time-consuming, it is low in efficiency. Especially, when the number of the images is quite huge, it will be hard to finish the image classification if a more efficient and more automatized classifying method is not in place.

In addition, although the image classifying method performed by judging the file name of the image is already widely used. For example, the image search function provided by many internet portal sites is the best example. However, when a general user names the image file, the file name is not needed to be directly related to the content of the image. Thus, when the user uses this image search function, the condition of search error still frequently occurs. This classifying method is apparently not accurate enough. In practical applications, although the accuracy of search can be improved by capturing some characteristics of the image (e.g., the color), its application will be limited in the personal computer end and the server end, and the effect of automatically classifying the digital images could not be satisfactorily reached.

Therefore, the main scope of the invention is to provide a digital image classifying method and apparatus to solve the above problems.

SUMMARY OF THE INVENTION

The invention provides a digital image classifying method and apparatus. An embodiment according to the invention is a digital image classifying method. At first, a discrete cosine transform (DCT) is performed on a candidate area of a digital image to generate a set of DCT coefficients. Then, a set of texture parameters are generated according to the set of DCT coefficients. Afterward, a classified result of the digital image is generated according to the set of texture parameters.

Because the DCT coefficient of the image corresponds to the texture characteristic of the image, the digital image classifying method and apparatus, according to the invention, obtain the texture information of the digital image through the DCT way, and generate the classified result of the digital image according to the texture information. Accordingly, the function of automatically classifying digital images or even automatically naming digital images can be achieved by the classifying method and apparatus.

Compared to the prior art, the method according to the invention can be performed on one single computer. Therefore, the time-consuming and energy-consuming drawbacks of manpower judgment can be improved. On the other hand, in the method of the invention, the images are classified based on their texture characteristics. Therefore, the classified result will be far more accurate than the one generated by classification based on the file names or the colors of the image.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
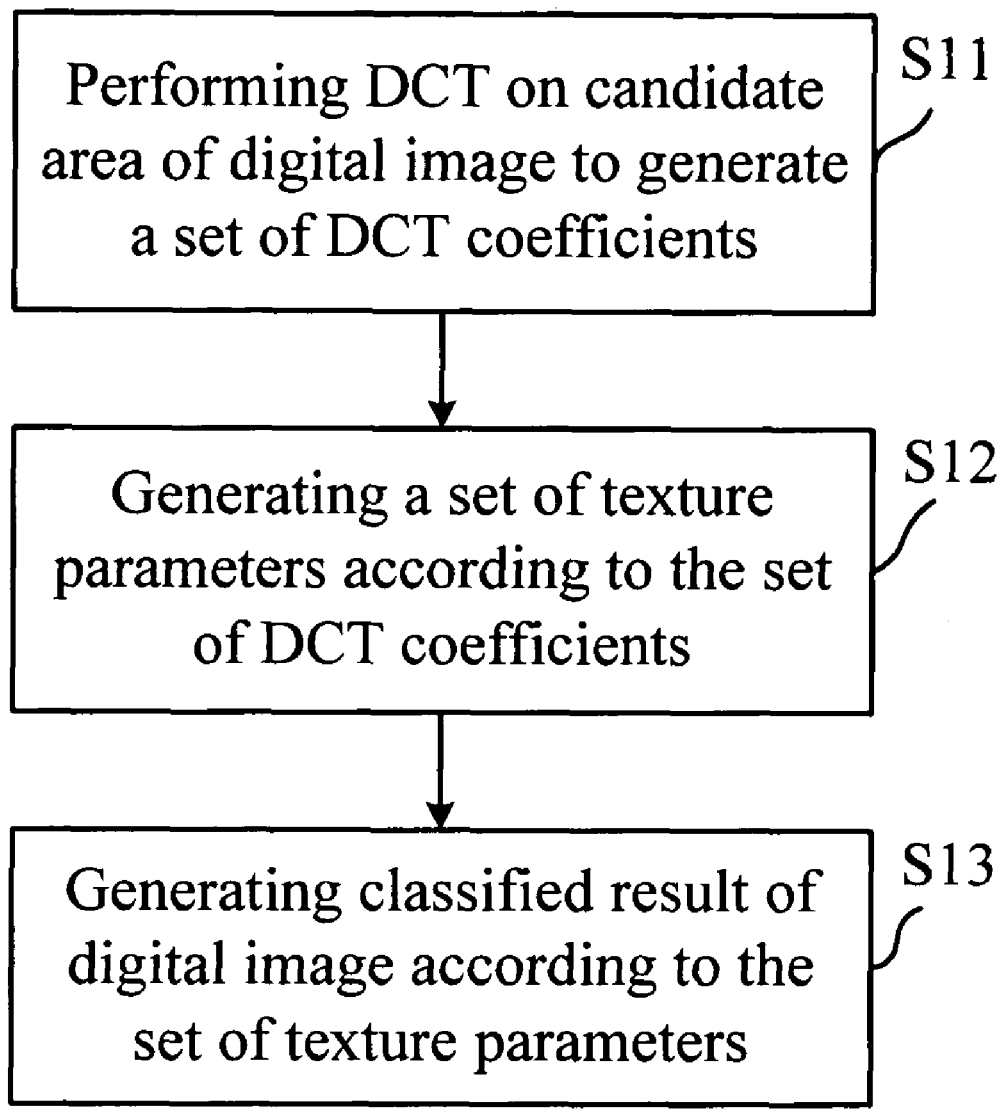
FIG. 1 is a flowchart of the digital image classifying method of the first embodiment according to the invention.

The first embodiment according to the invention is a digital image classifying method. Please refer to FIG. 1. FIG. 1 shows the flowchart of the digital image classifying method. As shown in FIG. 1, firstly, the step S11 is performed for performing a discrete cosine transform (DCT) on a candidate area of a digital image to generate a set of DCT coefficients. Then, the step S12 is performed for generating a set of texture parameters according to the set of DCT coefficients. Afterward, the step S13 is performed for generating a classified result of the digital image according to the set of texture parameters.

In practical applications, a plurality of predetermined classified results is provided in advance. Each of the predetermined classified results corresponds to a set of predetermined texture parameters respectively. The classified result mentioned in the step S13 is generated by comparing the set of texture parameters with the plural sets of predetermined texture parameters. The classified result is a category of people or a category of scenery. In addition, the set of texture parameters can comprise at least one of the following parameters: a smooth texture energy ($E_{DC}$), a vertical/horizontal texture energy ratio ($E_V/E_H$), and an oblique texture energy ($E_S$).

Figure 2:
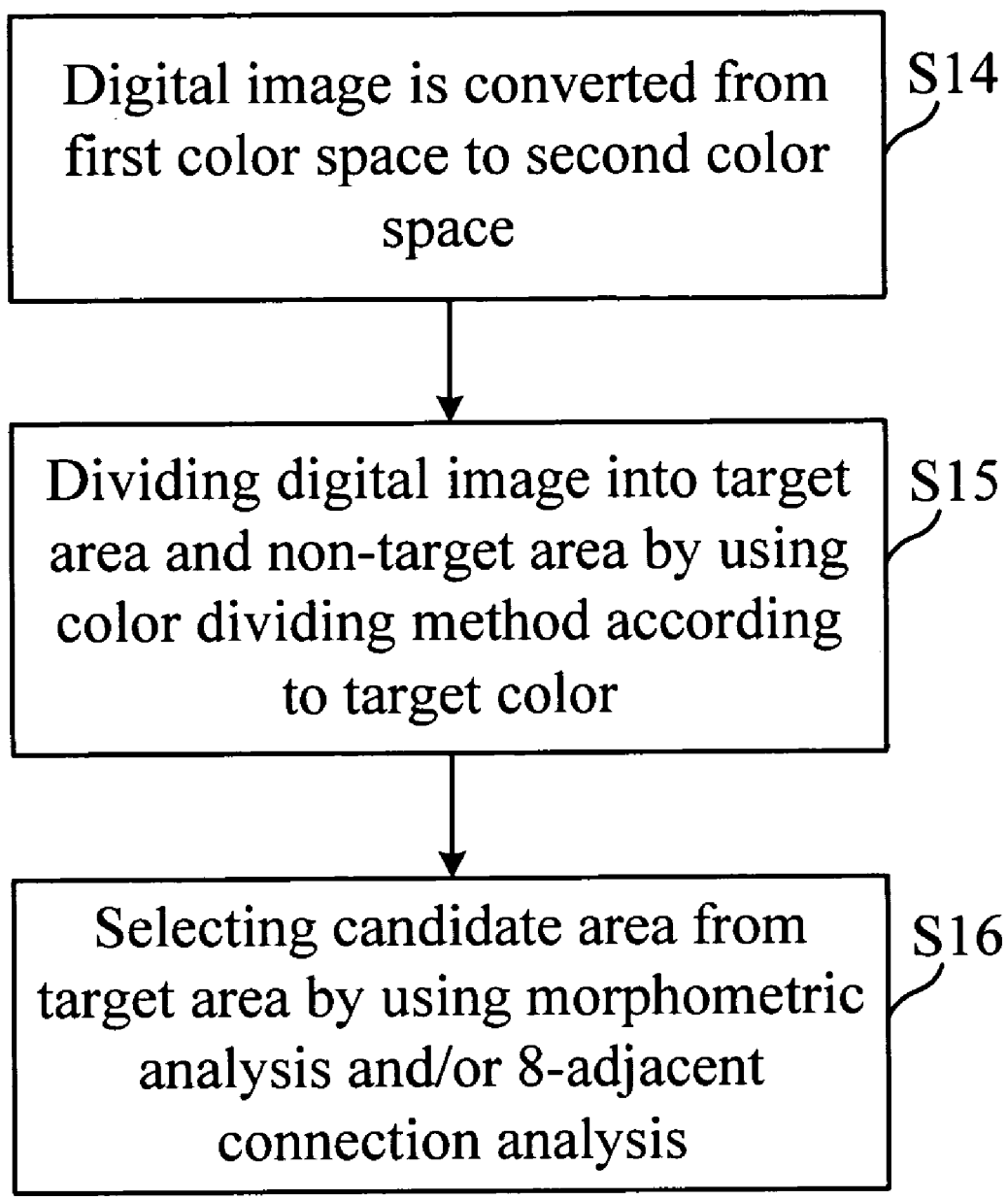
FIG. 2 is a flowchart of selecting the candidate area from the digital image.

Please refer to FIG. 2. FIG. 2 shows the possible ways of generating the above-mentioned candidate area. As shown in FIG. 2, the step S14 can be performed first for converting the digital image from a first color space to a second color space, wherein the second color space can be an HSV color space. Then, the step S15 is performed for dividing the digital image into a target area and a non-target area by using a color dividing method according to a target color. Afterward, the step S16 is performed for selecting the candidate area from the target area by using a morphometric analysis and/or an 8-adjacent connection analysis.

After the step S13 is performed for generating the classified result of the digital image, a name corresponding to the classified result can be selected from a look-up table. The digital image can then be named according to the name.

For example, it assumes that the name corresponding to the classified result A is "photo of people" and the name corresponding to the classified result B is "photo of scenery" in a look-up table. If the classified results of three digital pictures generated by performing the image classification according to the method all belong to the classified result A, then the three digital pictures can be named in an order of "photo of people 001," "photo of people 002," and "photo of people 003." On the contrary, if the classified results of three digital pictures generated by performing the image classification according to the method all belong to the classified result B, then the three digital pictures can be named in an order of "photo of scenery 001," "photo of scenery 002," and "photo of scenery 003."

In addition, the classified result can be further recorded in a tag or an exchangeable image file (EXIF) form of the digital image. After the classifying processes are performed, the desired images can be found faster according to the classified result when the image search is performed by the user or the electrical apparatus.

For example, it assumes that a user uses a digital camera to take a digital picture and stores the digital picture in a hard disk of a computer. If the skin tone is taken as a target color, then the digital picture can be divided into a skin tone area and a non-skin tone area by using a color dividing method in the digital image classifying method according to the invention. Then, at least one skin tone candidate area is selected from the skin tone area by adding the limiting conditions such as the length-width-ratio and the area through a morphometric analysis and/or an 8-adjacent connection analysis.

The classified result generated solely based on the colors of the image is not accurate enough, and misjudged conditions may occur. In order to improve the accuracy of digital image classification, whether the skin tone candidate area is the real skin tone area can be further judged based on the texture conditions of the image. In other words, a DCT can be performed on the skin tone candidate area to generate a set of DCT coefficients and a set of texture parameters corresponding to the DCT coefficients. The distribution of texture energy of the skin tone candidate area can be expressed by the set of texture parameters. Whether the skin tone candidate area is the real skin tone area can be judged more accurately by comparing the texture parameters.

Figure 3:
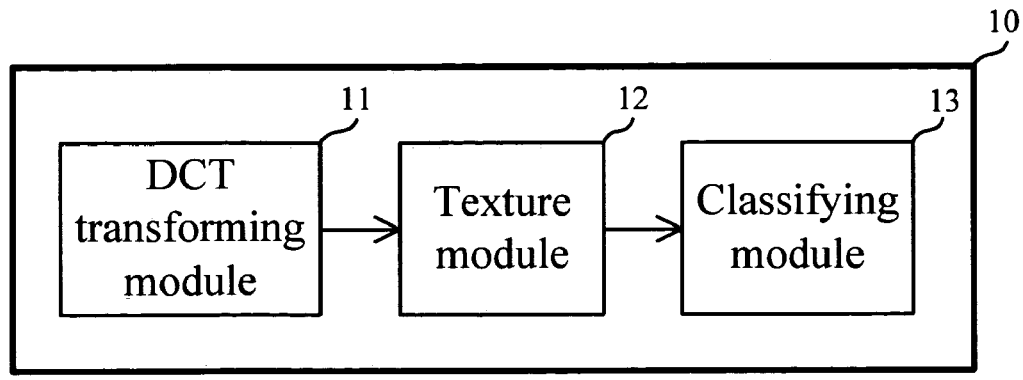
FIG. 3 is a functional block diagram of the digital image classifying apparatus of the second embodiment according to the invention.

The second embodiment according to the invention is a digital image classifying apparatus. The digital image classifying apparatus is applied to an image display/storing equipment. Please refer to FIG. 3. FIG. 3 shows the functional block diagram of the digital image classifying apparatus. As shown in FIG. 3, the digital image classifying apparatus 10 includes a DCT transforming module 11, a texture module 12, and a classifying module 13. The DCT transforming module 11 is used for performing a DCT on a candidate area of a digital image to generate a set of DCT coefficients. The texture module 12 is electrically connected to the DCT transforming module 11 and is used for generating a set of texture parameters according to the set of DCT coefficients. The classifying module 13 is electrically connected to the texture module 12 and is used for generating a classified result of the digital image according to the set of texture parameters.

Figure 4:
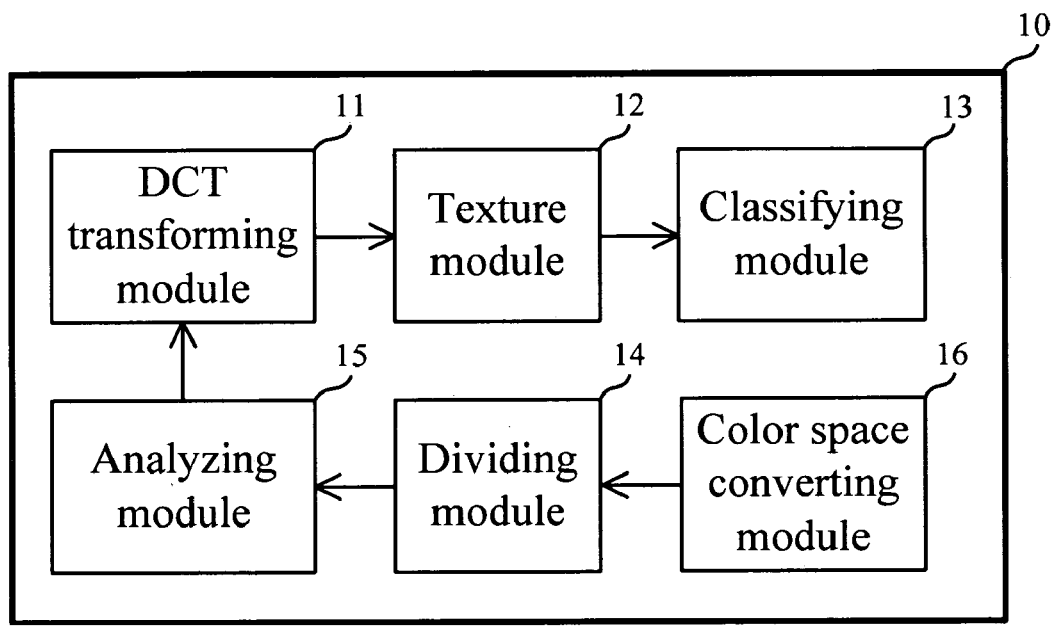
FIG. 4 is a functional block diagram of the digital image classifying apparatus shown in FIG. 3 further including a dividing module, an analyzing module, and a color space-converting module.

In practical applications, as shown in FIG. 4, the digital image classifying apparatus 10 can further include a dividing module 14 and an analyzing module 15. The dividing module 14 is used for dividing the digital image into a target area and a non-target area by using a color dividing method. The analyzing module 15 is electrically connected to the dividing module 14 and is used for selecting the candidate area from the target area by using a morphometric analysis and/or an 8-adjacent connection analysis. In addition, FIG. 5 also shows that the digital image classifying apparatus 10 can further include a color space-converting module 16. Before the digital image is divided by the dividing module 14, the color space-converting module 16 can be used for converting the digital image from a first color space to a second color space. In fact, the second color space can be an HSV color space.

Figure 5:
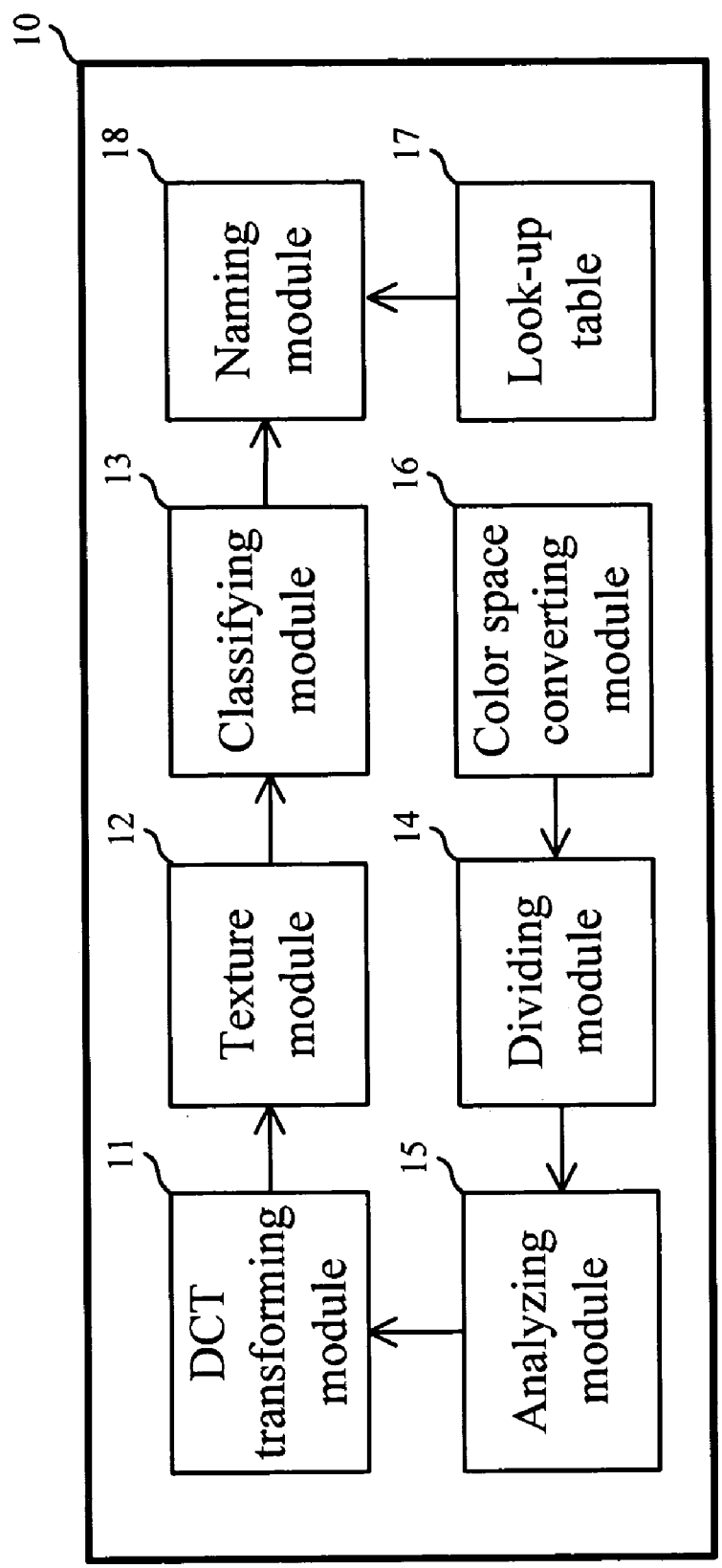
FIG. 5 is a functional block diagram of the digital image classifying apparatus shown in FIG. 4 further including a look-up table and a naming module.

Please refer to FIG. 5. FIG. 5 shows the functional block diagram of the digital image classifying apparatus 10 further including a look-up table 17 and a naming module 18. The look-up table 17 stores a name corresponding to the classified result. The naming module 18 is electrically connected to the classifying module 13 and the look-up table 17 and is used for selecting the name from the look-up table 17 according to the classified result and naming the image based on the name.

In addition, the digital image classifying apparatus 10 can further include a recording module (not shown in the figure). The recording module is electrically connected to the classifying module 13 and is used for recording the classified result in a tag or an EXIF form of the digital image. Accordingly, the desired images can be found much faster when the image search is performed.

Compared to the prior art, the method according to the invention can be performed on one single computer. Thus, the time-consuming and energy-consuming drawbacks of manpower judgment can be improved. On the other hand, in the method of the invention, the images are classified based on their texture characteristics. Therefore, the classified result will be far more accurate than the one generated by classifying based on the file names or the colors of the image. As mentioned above, the digital image classifying method and apparatus can avoid the drawbacks of conventional image classifying technology, and the function of automatically classifying digital images or even automatically naming digital images can be achieved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A digital image classifying method, comprising the steps of:
   performing a discrete cosine transform (DCT) on a candidate area of a digital image to generate a set of DCT coefficients;
   generating a set of texture parameters according to the set of DCT coefficients; and
   generating a classified result of the digital image according to the set of texture parameters;
   wherein the set of texture parameters comprises at least one of the following parameters: a smooth texture energy (EDC), a vertical/horizontal texture energy ratio (EV/EH), and an oblique texture energy (ES);

wherein the classified result is a category of people or a category of scenery wherein the candidate area is generated by the steps of:

(a1) dividing the digital image into a target area and a non-target area by using a color dividing method according to a target color; and (a2) selecting the candidate area from the target area by using a morphometric analysis and an 8-adjacent connection analysis.

2. The digital image classifying method of claim 1, wherein a plurality of predetermined classified results are provided in advance, each of the predetermined classified results corresponds to a set of predetermined texture parameters respectively, and the classified result is generated by comparing the set of texture parameters with the plural sets of predetermined texture parameters.

3. The digital image classifying method of claim 1, wherein before step (a1), the digital image is converted from a first color space to a second color space.

4. The digital image classifying method of claim 3, wherein the second color space is an HSV color space.

5. The digital image classifying method of claim 1, further comprising the step of:

recording the classified result in a tag or an exchangeable image file (EXIF) form of the digital image.

6. The digital image classifying method of claim 1, further comprising the steps of:

selecting a name corresponding to the classified result from a look-up table; and naming the digital image according to the name.

7. A digital image classifying apparatus for an image display/storing equipment, comprising:

a discrete cosine transform (DCT) transforming module, which is tangibly embodied in a computer device, for performing a DCT on a candidate area of a digital image to generate a set of DCT coefficients;

a texture module, which is tangibly embodied in the computer device, electrically connected to the DCT transforming module, for generating a set of texture parameters according to the set of DCT coefficients;

a classifying module, which is tangibly embodied in the computer device, electrically connected to the texture module, for generating a classified result of the digital image according to the set of texture parameters;

a dividing module, which is tangibly embodied in the computer device, for dividing the digital image into a target area and a non-target area by using a color dividing method; and an analyzing module, which is tangibly embodied in the computer device, electrically connected to the dividing module, for selecting the candidate area from the target area by using a morphometric analysis and an 8-adjacent connection analysis;

wherein the set of texture parameters comprises at least one of the following parameters: a smooth texture energy (EDC), a vertical/horizontal texture energy ratio (EV/EH), and an oblique texture energy (ES);

wherein the classified result is a category of people or a category of scenery.

8. The digital image classifying apparatus of claim 7, wherein a plurality of predetermined classified results are provided in advance, each of the predetermined classified results corresponds to a set of predetermined texture parameters respectively, and the classifying module selects the classified result from the predetermined classified results by comparing the set of texture parameters with the plural sets of predetermined texture parameters.

9. The digital image classifying apparatus of claim 7, further comprising:

a color space converting module, which is tangibly embodied in the computer device, before the digital image is divided by the dividing module, the color space-converting module converting the digital image from a first color space to a second color space.

10. The digital image classifying apparatus of claim 9, wherein the second color space is an HSV color space.

11. The digital image classifying apparatus of claim 7, further comprising:

a recording module, which is tangibly embodied in the computer device, electrically connected to the classifying module, for recording the classified result in a tag or an exchangeable image file (EXIF) form of the digital image.

12. The digital image classifying apparatus of claim 7, further comprising:

a look-up table therein storing a name corresponding to the classified result; and a naming module, which is tangibly embodied in the computer device, electrically connected to the classifying module and the look-up table, for selecting the name from the look-up table according to the classified result and naming the image based on the name.

13. A digital image classifying apparatus for an image display/storing equipment, comprising:

a discrete cosine transform (DCT) transforming module, which is tangibly embodied in a computer device, for performing a DCT on a candidate area of a digital image to generate a set of DCT coefficients;

a texture module, which is tangibly embodied in the computer device, electrically connected to the DCT transforming module, for generating a set of texture parameters according to the set of DCT coefficients;

a classifying module, which is tangibly embodied in the computer device, electrically connected to the texture module, for generating a classified result of the digital image according to the set of texture parameters;

a dividing module, which is tangibly embodied in the computer device, for dividing the digital image into a target area and a non-target area by using a color dividing method; and an analyzing module, which is tangibly embodied in the computer device, electrically connected to the dividing module, for selecting the candidate area from the target area by using a morphometric analysis or an 8-adjacent connection analysis;

wherein the set of texture parameters comprises at least one of the following parameters: a smooth texture energy (EDC), a vertical/horizontal texture energy ratio (EV/EH), and an oblique texture energy (ES);

wherein the classified result is a category of people or a category of scenery.

* * * * *